US008615052B2

(12) United States Patent
Gomadam et al.

(10) Patent No.: US 8,615,052 B2
(45) Date of Patent: Dec. 24, 2013

(54) ENHANCED CHANNEL FEEDBACK FOR MULTI-USER MIMO

(75) Inventors: Krishna Srikanth Gomadam, Sunnyvale, CA (US); Adoram Erell, Herzliya (IL)

(73) Assignee: Marvell World Trade Ltd., St. Michael (BB)

( * ) Notice: Subject to any disclaimer, the term of this patent is extended or adjusted under 35 U.S.C. 154(b) by 94 days.

(21) Appl. No.: 13/253,078

(22) Filed: Oct. 5, 2011

(65) Prior Publication Data

US 2012/0087435 A1    Apr. 12, 2012

Related U.S. Application Data

(60) Provisional application No. 61/390,423, filed on Oct. 6, 2010, provisional application No. 61/393,797, filed on Oct. 15, 2010, provisional application No. 61/411,845, filed on Nov. 9, 2010.

(51) Int. Cl.
*H04B 7/02* (2006.01)
(52) U.S. Cl.
USPC .......................................... 375/267; 375/260
(58) Field of Classification Search
USPC ....................................................... 375/267
See application file for complete search history.

(56) References Cited

U.S. PATENT DOCUMENTS

| 5,231,629 A | 7/1993 | Kotzin et al. |
| 5,349,567 A | 9/1994 | Reed |
| 5,940,439 A | 8/1999 | Kleider et al. |
| 6,466,904 B1 | 10/2002 | Gao et al. |
| 6,512,750 B1 | 1/2003 | Palenius |
| 6,757,319 B1 | 6/2004 | Parsa et al. |
| 6,865,237 B1 | 3/2005 | Boariu et al. |
| 7,839,944 B2 | 11/2010 | Lee et al. |
| 7,941,186 B2 * | 5/2011 | Cho et al. ........................ 455/561 |
| 8,036,286 B2 | 10/2011 | Lee et al. |
| 8,068,555 B2 | 11/2011 | Jongren et al. |
| 8,098,750 B2 | 1/2012 | Mueck et al. |

(Continued)

FOREIGN PATENT DOCUMENTS

| EP | 2182754 A1 | 5/2010 |
| JP | 2008147792 A | 6/2008 |

(Continued)

OTHER PUBLICATIONS

Huang et al., "A Limited Feedback Precoding System with Hierarchical Codebook and Linear Receiver", IEEE Transactions on Wireless Communications, vol. 7, No. 12, pp. 4843-4848, Dec. 2008.

(Continued)

*Primary Examiner* — Chieh M Fan
*Assistant Examiner* — Santiago Garcia (57) ABSTRACT

A method includes receiving in a mobile communication terminal over a communication channel a Multiple-Input Multiple-Output (MIMO) signal that includes at least a transmission addressed to the terminal. A Multi-User Signal to Noise Ratio (MU-SNR) is estimated in the terminal based on the received signal. The MU-SNR is indicative of a power ratio between the transmission addressed to the terminal and remaining components of the signal, which are assumed to include one or more transmissions addressed to one or more other terminals. Feedback, which is indicative of the communication channel and is based on the MU-SNR, is transmitted from the terminal.

16 Claims, 2 Drawing Sheets

(56) References Cited

U.S. PATENT DOCUMENTS

| | | |
|---|---|---|
| 8,179,775 B2 | 5/2012 | Chen et al. |
| 8,325,844 B2 | 12/2012 | Walton et al. |
| 2003/0035491 A1 | 2/2003 | Walton et al. |
| 2005/0141630 A1 | 6/2005 | Catreaux et al. |
| 2005/0157810 A1 | 7/2005 | Raleigh et al. |
| 2005/0237920 A1 | 10/2005 | Howard et al. |
| 2005/0250544 A1 | 11/2005 | Grant et al. |
| 2006/0014554 A1 | 1/2006 | Gerlach |
| 2006/0056538 A1 | 3/2006 | Nam et al. |
| 2006/0093060 A1 | 5/2006 | Jung et al. |
| 2006/0114858 A1 | 6/2006 | Walton et al. |
| 2006/0153112 A1 | 7/2006 | Lim et al. |
| 2006/0203777 A1 | 9/2006 | Kim et al. |
| 2006/0233131 A1 | 10/2006 | Gore et al. |
| 2006/0276212 A1 | 12/2006 | Sampath et al. |
| 2007/0058746 A1 | 3/2007 | Gueguen |
| 2007/0076810 A1 | 4/2007 | Herrera et al. |
| 2007/0099578 A1 | 5/2007 | Adeney et al. |
| 2007/0149229 A1 | 6/2007 | Frederiksen et al. |
| 2007/0153731 A1 | 7/2007 | Fine |
| 2007/0160162 A1 | 7/2007 | Kim et al. |
| 2007/0165738 A1 | 7/2007 | Barriac et al. |
| 2007/0223422 A1 | 9/2007 | Kim et al. |
| 2007/0223423 A1* | 9/2007 | Kim et al. ............ 370/334 |
| 2007/0230373 A1 | 10/2007 | Li et al. |
| 2007/0253386 A1 | 11/2007 | Li et al. |
| 2007/0270170 A1 | 11/2007 | Yoon et al. |
| 2008/0013610 A1 | 1/2008 | Varadarajan et al. |
| 2008/0025336 A1* | 1/2008 | Cho et al. ............ 370/432 |
| 2008/0039067 A1 | 2/2008 | Jin et al. |
| 2008/0080364 A1 | 4/2008 | Barak et al. |
| 2008/0080632 A1 | 4/2008 | Kim et al. |
| 2008/0080634 A1 | 4/2008 | Kotecha et al. |
| 2008/0080635 A1 | 4/2008 | Hugl et al. |
| 2008/0080637 A1 | 4/2008 | Khan et al. |
| 2008/0095258 A1 | 4/2008 | She et al. |
| 2008/0101407 A1 | 5/2008 | Khan et al. |
| 2008/0108310 A1 | 5/2008 | Tong et al. |
| 2008/0112351 A1 | 5/2008 | Surineni et al. |
| 2008/0130778 A1 | 6/2008 | Xia et al. |
| 2008/0144522 A1 | 6/2008 | Chang et al. |
| 2008/0165875 A1 | 7/2008 | Mundarath et al. |
| 2008/0192852 A1 | 8/2008 | Kent et al. |
| 2008/0198776 A1 | 8/2008 | Seo |
| 2008/0232494 A1 | 9/2008 | Pan et al. |
| 2008/0232503 A1 | 9/2008 | Kim |
| 2008/0247364 A1 | 10/2008 | Kim et al. |
| 2008/0247475 A1 | 10/2008 | Kim et al. |
| 2008/0268855 A1 | 10/2008 | Hanuni et al. |
| 2008/0268887 A1 | 10/2008 | Jansen et al. |
| 2008/0285433 A1 | 11/2008 | Akita et al. |
| 2008/0292013 A1 | 11/2008 | Varadarajan et al. |
| 2008/0298452 A1 | 12/2008 | Sampath et al. |
| 2008/0298482 A1 | 12/2008 | Rensburg et al. |
| 2008/0318606 A1 | 12/2008 | Tsutsui et al. |
| 2009/0011761 A1 | 1/2009 | Han et al. |
| 2009/0016263 A1 | 1/2009 | Kishigami et al. |
| 2009/0046800 A1 | 2/2009 | Xu et al. |
| 2009/0098876 A1 | 4/2009 | Khan et al. |
| 2009/0110114 A1 | 4/2009 | Onggosanusi et al. |
| 2009/0122857 A1 | 5/2009 | Li et al. |
| 2009/0161605 A1 | 6/2009 | Shen et al. |
| 2009/0180561 A1 | 7/2009 | Kim et al. |
| 2009/0252333 A1 | 10/2009 | Chang et al. |
| 2009/0282310 A1 | 11/2009 | Seok et al. |
| 2009/0296844 A1 | 12/2009 | Ihm et al. |
| 2009/0304109 A1 | 12/2009 | Kotecha |
| 2010/0031117 A1 | 2/2010 | Lee et al. |
| 2010/0034308 A1 | 2/2010 | Kim et al. |
| 2010/0035627 A1 | 2/2010 | Hou et al. |
| 2010/0054354 A1 | 3/2010 | Tosato |
| 2010/0056170 A1 | 3/2010 | Lindoff et al. |
| 2010/0061477 A1 | 3/2010 | Lee et al. |
| 2010/0067512 A1 | 3/2010 | Nam et al. |
| 2010/0069106 A1 | 3/2010 | Swarts et al. |
| 2010/0074301 A1* | 3/2010 | Howard et al. ............ 375/130 |
| 2010/0103834 A1 | 4/2010 | Gorokhov et al. |
| 2010/0158151 A1 | 6/2010 | Krauss et al. |
| 2010/0172424 A1 | 7/2010 | Perets et al. |
| 2010/0172430 A1 | 7/2010 | Melzer et al. |
| 2010/0173639 A1 | 7/2010 | Li et al. |
| 2010/0215112 A1 | 8/2010 | Tsai et al. |
| 2010/0220800 A1 | 9/2010 | Erell et al. |
| 2010/0238984 A1 | 9/2010 | Sayana et al. |
| 2010/0254474 A1* | 10/2010 | Gomadam et al. ............ 375/267 |
| 2010/0260234 A1 | 10/2010 | Thomas et al. |
| 2010/0260243 A1 | 10/2010 | Ihm et al. |
| 2010/0267341 A1 | 10/2010 | Bergel et al. |
| 2010/0271968 A1 | 10/2010 | Liu et al. |
| 2010/0273514 A1 | 10/2010 | Koo et al. |
| 2010/0278278 A1 | 11/2010 | Lee et al. |
| 2010/0284484 A1 | 11/2010 | Jongren et al. |
| 2010/0290548 A1 | 11/2010 | Hoshno et al. |
| 2010/0296603 A1 | 11/2010 | Lee et al. |
| 2011/0019631 A1 | 1/2011 | Kotecha et al. |
| 2011/0026413 A1 | 2/2011 | Swarts et al. |
| 2011/0034175 A1 | 2/2011 | Fong et al. |
| 2011/0058621 A1 | 3/2011 | Clerckx et al. |
| 2011/0064156 A1* | 3/2011 | Kim et al. ............ 375/267 |
| 2011/0077038 A1 | 3/2011 | Montojo et al. |
| 2011/0080969 A1 | 4/2011 | Jongren et al. |
| 2011/0085610 A1 | 4/2011 | Zhuang et al. |
| 2011/0096704 A1 | 4/2011 | Erell et al. |
| 2011/0103534 A1 | 5/2011 | Axmon et al. |
| 2011/0110403 A1 | 5/2011 | Jongren |
| 2011/0110450 A1 | 5/2011 | Gomadam et al. |
| 2011/0150052 A1* | 6/2011 | Erell et al. ............ 375/219 |
| 2011/0164701 A1 | 7/2011 | Nikopourdeilami et al. |
| 2011/0170435 A1 | 7/2011 | Kim et al. |
| 2011/0188393 A1 | 8/2011 | Mallik et al. |
| 2011/0194594 A1 | 8/2011 | Noh et al. |
| 2011/0194638 A1 | 8/2011 | Erell et al. |
| 2011/0194644 A1 | 8/2011 | Liu et al. |
| 2011/0205930 A1 | 8/2011 | Rahman et al. |
| 2011/0235608 A1 | 9/2011 | Koo et al. |
| 2011/0250919 A1 | 10/2011 | Barbieri et al. |
| 2011/0268204 A1 | 11/2011 | Choi et al. |
| 2011/0306341 A1 | 12/2011 | Klein et al. |
| 2012/0002568 A1 | 1/2012 | Tiirola et al. |
| 2012/0020433 A1* | 1/2012 | Bhattad et al. ............ 375/296 |
| 2012/0033592 A1* | 2/2012 | Kim et al. ............ 370/310 |
| 2012/0058735 A1* | 3/2012 | Vermani et al. ............ 455/69 |
| 2012/0063336 A1* | 3/2012 | Shany et al. ............ 370/252 |
| 2012/0069887 A1 | 3/2012 | Park et al. |
| 2012/0069917 A1 | 3/2012 | Liu et al. |
| 2012/0087425 A1 | 4/2012 | Gomadam et al. |
| 2012/0134434 A1 | 5/2012 | Chen et al. |
| 2012/0219042 A1 | 8/2012 | Onggosanusi et al. |
| 2012/0219083 A1 | 8/2012 | Tong et al. |
| 2012/0257664 A1* | 10/2012 | Yue et al. ............ 375/227 |
| 2012/0275376 A1* | 11/2012 | Sampath et al. ............ 370/328 |
| 2012/0275386 A1 | 11/2012 | Frenne et al. |
| 2012/0281620 A1* | 11/2012 | Sampath et al. ............ 370/328 |
| 2013/0028068 A1 | 1/2013 | Park et al. |
| 2013/0028344 A1 | 1/2013 | Chen et al. |
| 2013/0039284 A1 | 2/2013 | Marinier et al. |
| 2013/0051256 A1* | 2/2013 | Ong et al. ............ 370/252 |
| 2013/0107916 A1* | 5/2013 | Liu et al. ............ 375/219 |
| 2013/0182786 A1 | 7/2013 | Frenne et al. |

FOREIGN PATENT DOCUMENTS

| | | |
|---|---|---|
| WO | 2007133564 A3 | 11/2007 |
| WO | 2008009157 A1 | 1/2008 |
| WO | 2008133582 A2 | 11/2008 |
| WO | 2010013950 A2 | 2/2010 |
| WO | 2011147692 A1 | 12/2011 |

OTHER PUBLICATIONS

Kim et al., "Efficient Feedback via Subspace-Based Channel Quantization for Distributed Cooperative Antenna Systems with Temporarily Correlated Channels", EURASIP Journal on Advances in Signal Processing, vol. 2008, Nov. 23, 2007.

(56) References Cited

OTHER PUBLICATIONS

NTT Docomo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
JP Patent Application # 2011-544111 Official Action dated Nov. 6, 2012.
U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4x2 and 4x4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16—2001, IEEE Computer Society and IEE Microwave Theory and Techniques Society, USA, Oct. 1, 2004.
NTT DOCOMO et al., "Prioritized Deployment Scenarios for LTE-Advanced Studies", 3GPP TSG RAN WG4 Meeting # 50, Athens, Greece, Feb. 9-13, 2009 (R4-091011).
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8x8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
ETSI TS 136213, "LTE; Evolved Universal Terrestrial Radio Access (E-UTRA), Physical Layer Procedures", V10.2.0, Jun. 2011.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed on Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009 (R1-092415).
Nokia Siemens Networks, "PUSCH Power Control for LTE-Advanced", 3GPP TSG RAN WG1 Meeting # 57bis, Los Angeles, USA, Jun. 29-Jul. 3, 2009 (R1-092574).
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008 (R1-083103).
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).

(56) References Cited

OTHER PUBLICATIONS

Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009 (R1-090235).
Qualcomm Europe, Notion of Anchor Carrier in LTE-A, 3GPP TSG RAN WG1 Meeting #55-bis, Ljubljana, Slovenia, Jan. 12-16, 2009 (R1-080356).
Samsung, "UL Transmission Power Control in LTE-A", 3GPP TSG RAN WG1 Meeting #56bis, Seoul, Korea, Mar. 23-27, 2009 (R1-091250).
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT DOCOMO, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
Samsung, "Discussion on Enhanced DL Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
U.S. Appl. No. 13/052,075, filed Mar. 20, 2011.
Marvell, "Codebook Adaptation for ULA Antenna", 3GPP TSG RAN WG1 Meeting #60, San Francisco, USA, Feb. 22-22, 2010.
U.S. Appl. No. 61/321,386, filed Apr. 6, 2010.
U.S. Appl. No. 61/294,737, filed Mar. 13, 2010.
U.S. Appl. No. 12/902,168, filed Oct. 12, 2010.
U.S. Appl. No. 12/903,237, filed Oct. 13, 2010.
Alcatel-Lucent, "Fractional Power Control Using Pilot Power Ration Measurements for the E-UTRA Uplink", 3GPP TSG Ran WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
CATT, "Feedback enhancements for LTE-A downlink transmission", 3GPP TSG RAN WG1 Meeting #59, Jeju, Korea, Nov. 9-13, 2009.
U.S. Appl. No. 13/346,737, filed Jan. 10, 2012.
U.S. Appl. No. 13/433,293, filed Mar. 29, 2012.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009 (R1-092395).
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT DOCOMO), "Text Proposal for RAN1 TR on LTE Advanced", 3GPP TSG RAN WG1 Meeting #53bis, Warsaw, Poland, Jun. 30-Jul. 4, 2008.
Ericsson, "Design and Evaluation of Precoder Codebooks for CSI Feedback", 3GPP TSG RAN WG1 61bis, Dresden, Germany, Jun. 28-Jul. 2, 2010.
Samsung, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.
Alcatel-Lucent et al., "Further Analysis of Companion Feedback Performance and Feedback Signaling Overhead Reduction", 3GPP TSG RAN WG1 62, Madrid, Spain, Aug. 23-27, 2010.
Alcatel-Lucent et al., "Way Forward on CQI/PMI Reporting Enhancement on PUSCH 3-1 for 2, 4 and 8 TX", 3GPP TSG RAN WG1 62bis, Xian, China, Oct. 11-15, 2010.
Marvell, "CQI Enhancement for 4Tx", 3GPP TSG-RAN WG1 #62bis, Xian, Oct. 11-15, 2010.
NEC Group, "Enhancing MU-MIMO CQI," 3GPP TSG-RAN WGl #62bis, Xian, China, Oct. 11-15, 2010.
LG Electronics, "Further Discussion on CQI/PMI Enhancement", 3GPP TSG RAN # 62BIS, Xian, China, Oct. 11-15, 2010.

(56) References Cited

OTHER PUBLICATIONS

Marvell, "Two-Component PMI Codebook for 8TX", 3GPP TSG RAN # 62 Meeting, Madrid, Spain, Aug. 23-27, 2010.
Marvell, "Details of PUCCH 1-1 for 8Tx", 3GPP TSG RAN # 63, Jacksonville, USA, Nov. 15-19, 2010.
Alcatel-Lucent et al., "Way Forward on Enhancement for Rel.10 DL MIMO", 3GPP TSG RAN WG1 62, Madrid, Spain, Aug. 23-27, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
Zte, "Initial CoMP Evaluation for Homogeneous Network with High Tx Power RRHs", 3GPP TSG RAN # 64, Taipei, Taiwan, Feb. 21-25, 2011.
U.S. Appl. No. 12/723,647 Official Action dated Feb. 6, 2012.
U.S. Appl. No. 12/723,647 Official Action dated Apr. 27, 2012.
U.S. Appl. No. 12/652,044 Official Action dated Feb. 7, 2012.
Alcatel-Lucent et al., "Way Forward on 8Tx Codebook for Rel.10 DL MIMO", 3GPP TSG RAN WG1 62, Madrid, Spain, Aug. 23-27, 2010.
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
U.S. Appl. No. 13/610,904, filed Sep. 12, 2012.
3GPP TR 36.819 "3rd Generation Partnership Project; Technical Specification Group Radio Access Network; Coordinated Multi-Point Operation for LTE Physical Layer Aspects (release 11)", version 11.0.0, Sep. 2011.
Japanese Patent Application # 2011-544111 Office Action dated Mar. 12, 2013.
U.S. Appl. No. 13/252,218 Office Action dated Apr. 11, 2013.
Zte, "Link Analysis of 4Tx Codebook Design for DL SU-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/902,168 Office Action dated Aug. 5, 2013.
U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
International Application PCT/IB2013/052963 Search Report dated Sep. 27, 2013.

\* cited by examiner

ENHANCED CHANNEL FEEDBACK FOR MULTI-USER MIMO

CROSS-REFERENCE TO RELATED APPLICATIONS

This application claims the benefit of U.S. Provisional Patent Application 61/390,423, filed Oct. 6, 2010, U.S. Provisional Patent Application 61/393,797, filed Oct. 15, 2010, and U.S. Provisional Patent Application 61/411,845, filed Nov. 9, 2010, whose disclosures are incorporated herein by reference.

FIELD OF THE DISCLOSURE

The present invention relates generally to communication systems, and particularly to channel feedback schemes.

BACKGROUND

In some communication systems, a mobile communication terminal receives downlink signals from a base station over a communication channel, and sends feedback indicative of the communication channel to the base station. The base station configures subsequent transmissions based on the feedback. Channel feedback of this sort is used, for example, in Evolved Universal Terrestrial Radio Access (E-UTRA) systems specified by the $3^{rd}$ Generation Partnership Project (3GPP). These systems are also referred to as Long Term Evolution (LTE) and LTE Advanced (LTE-A).

Channel feedback schemes for LTE and LTE-A systems are discussed, for example, in 3GPP Technical Specification Group Radio Access Network Working Group 1 (TSG-RAN WG1) document R1-105032, entitled "Way Forward on Enhancement for Rel.10 DL MIMO," Madrid, Spain, Aug. 23-27, 2010; in 3GPP TSG-RAN WG1 document R1-104477, entitled "Higher CSI Feedback Accuracy Proposals for 4/8Tx Rel.10 DL MIMO," Madrid, Spain, Aug. 23-27, 2010; in 3GPP TSG-RAN WG1 document R1-104474, entitled "Views and Simulation Results on 4Tx Codebook Enhancements," Madrid, Spain, Aug. 23-27, 2010; and in 3GPP TSG-RAN WG1 document R1-104398, entitled "Further Analysis of Companion Feedback Performance and Feedback Signaling Overhead Reduction," Madrid, Spain, Aug. 23-27, 2010, which are all incorporated herein by reference.

Other channel feedback schemes are addressed in 3GPP TSG-RAN WG1 document R1-105801, entitled "Way Forward on CQI/PMI Reporting Enhancement on PUSCH 3-1 for 2, 4 and 8 TX," Xian, China, Oct. 11-15, 2010; in 3GPP TSG-RAN WG1 document R1-105189, entitled "CQI Enhancement for 4Tx," Xian, China, Oct. 11-15, 2010; in 3GPP TSG-RAN WG1 document R1-105412, entitled "Enhancing MU-MIMO CQI," Xian, China, Oct. 11-15, 2010; and in 3GPP TSG-RAN WG1 document R1-105656, entitled "Further discussion on CQI/PMI enhancement," Xian, China, Oct. 11-15, 2010, which are incorporated herein by reference.

The description above is presented as a general overview of related art in this field and should not be construed as an admission that any of the information it contains constitutes prior art against the present patent application.

SUMMARY

An embodiment that is described herein provides a method including receiving in a mobile communication terminal over a communication channel a Multiple-Input Multiple-Output (MIMO) signal. The MIMO signal includes at least a transmission addressed to the terminal. A Multi-User Signal to Noise Ratio (MU-SNR) is estimated in the terminal based on the received signal. The MU-SNR is indicative of a power ratio between the transmission addressed to the terminal and remaining components of the signal, which are assumed to include one or more transmissions addressed to one or more other terminals. Feedback, which is indicative of the communication channel and is based on the MU-SNR, is transmitted from the terminal.

In some embodiments, estimating the MU-SNR includes computing the MU-SNR under an assumption that the transmissions addressed to the other terminals are precoded with respective precoding vectors that are orthogonal to a precoding vector requested by the terminal for precoding the transmission addressed to the terminal.

In an example embodiment, computing the MU-SNR includes averaging the MU-SNR over multiple possible choices of the orthogonal precoding vectors. In a disclosed embodiment, the MIMO signal is transmitted from a base station using $N_T$ transmit antennas, and computing the MU-SNR includes calculating the MU-SNR over $N_T-1$ possible choices of the orthogonal precoding vectors. In another embodiment, computing the MU-SNR includes assigning to the transmissions addressed to the other terminals respective power levels, at least two of which being different from one another.

In some embodiments, the method includes estimating a Single-User Signal to Noise Ratio (SU-SNR), which is computed under an assumption that the signal is addressed only to the terminal, and transmitting the feedback includes transmitting first feedback based on the SU-SNR and second feedback based on the MU-SNR. In an embodiment, transmitting the first and second feedback includes sending one of the first and second feedback in a format that is differentially encoded relative to the other of the first and second feedback. In another embodiment, transmitting the first and second feedback includes sending the first and second feedback encoded independently of one another. In yet another embodiment, transmitting the first and second feedback includes sending the first feedback at a first update rate, and sending the second feedback at a second update rate, different from the first update rate.

In an embodiment, the communication feedback includes at least one feedback type selected from a group of types consisting of a Rank-1 Channel Quality Indication (CQI) and a Rank-2 CQI.

There is additionally provided, in accordance with an embodiment that is described herein, apparatus including a receiver, a processor and a transmitter. The receiver is configured to receive over a communication channel a Multiple-Input Multiple-Output (MIMO) signal that includes at least a transmission addressed to the receiver The processor is configured to estimate, based on the received signal, a Multi-User Signal to Noise Ratio (MU-SNR), which is indicative of a power ratio between the transmission addressed to the receiver and remaining components of the signal, which are assumed to include one or more transmissions addressed to one or more other receivers, and to calculate feedback that is indicative of the communication channel and is based on the MU-SNR. The transmitter is configured to transmit the feedback.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Embodiments that are described herein provide improved channel feedback schemes for use in mobile wireless communication networks. Although the embodiments described herein refer mainly to LTE and LTE-A, the disclosed techniques are applicable to any other suitable type of communication protocol or standard.

In some embodiments, a base station supports both a Single-User Multiple-Input Multiple-Output (SU-MIMO) mode and a Multi-User MIMO (MU-MIMO) mode. In the SU-MIMO mode, the base station transmits only to a single terminal on a given time-frequency resource, using multiple transmit antennas. In the MU-MIMO mode, the base station transmits to multiple terminals simultaneously on the same time-frequency resource via the multiple transmit antennas. In the MU-MIMO mode, simultaneous transmissions to different terminals are typically precoded with different precoding vectors, i.e., different sets of weights that are applied to the transmit antennas and steer the transmission beams in the desired directions.

In these embodiments, each terminal sends to the base station feedback that is indicative of the communication channel. The feedback may comprise, for example, a Signal to Noise Ratio (SNR), a Channel Quality Indication (CQI) indicative of the preferred Modulation and Coding Scheme (MCS) to be used in subsequent transmissions, or a Precoding Matrix Indication (PMI) indicative of the preferred precoding matrix to be used for subsequent transmissions. The base station configures its subsequent transmissions based on the feedback received from the terminals.

The terminal calculates the feedback by processing the downlink signal it receives from the base station. Typically, however, the terminal has no information as to whether the base station is currently operating in the SU-MIMO mode or in the MU-MIMO mode. In other words, the terminal has no information whether the received downlink signal contains only a single transmission addressed to the terminal, or whether the signal contains additional simultaneous transmissions addressed to other terminals.

The base station possesses this information, but on the other hand does not have access to the downlink signal as it is received and measured by the terminal. Thus, neither the terminal alone nor the base station alone has the complete information for calculating the optimal channel feedback that would enable the base station to optimally configure its transmissions.

It is possible in principle for the terminal to calculate the channel feedback regardless of whether the base station uses SU-MIMO or MU-MIMO, for example by always assuming SU-MIMO. This solution, however, may cause the base station to mis-configure its subsequent transmissions and lead to severe performance degradation.

The methods and systems described herein provide an effective solution to this problem. In some embodiments, the terminal uses the downlink signal to calculate two types of SNR: A Single-User SNR (SU-SNR) and a Multi-User SNR (MU-SNR). The SU-SNR is calculated under the assumption that the downlink signal contains only a single transmission addressed to the terminal. The MU-SNR, on the other hand, is calculated under the assumption that the downlink signal contains one or more additional transmissions addressed to one or more other terminals, in addition to the transmission addressed to the terminal.

The terminal typically calculates two types of feedback based on the two types of SNR corresponding to SU and MU transmission, and sends the two types of feedback to the base station. In some embodiments one feedback type is encoded differentially relative to the other feedback type, in order to reduce signaling overhead. The base station configures its subsequent transmissions based on the SU and/or MU feedback received from the terminals.

In various embodiments, the terminal calculates the MU-SNR in different ways. In one embodiment, the terminal assumes that the base station precodes transmissions to other terminals using precoding vectors that are orthogonal to one another and to the precoding vector requested by the terminal for precoding its own transmission. In an embodiment, the terminal calculates the MU-SNR under this assumption, for example by averaging the SNR over multiple possible choices of orthogonal precoding vectors for the other transmissions.

When using the disclosed techniques, the terminal provides the base station with enhanced channel feedback that is applicable to both single-user and multi-user scenarios. Based on such feedback, the base station is able to optimize its subsequent transmissions, and therefore improve downlink throughput and quality and reduce interference.

Figure 1:
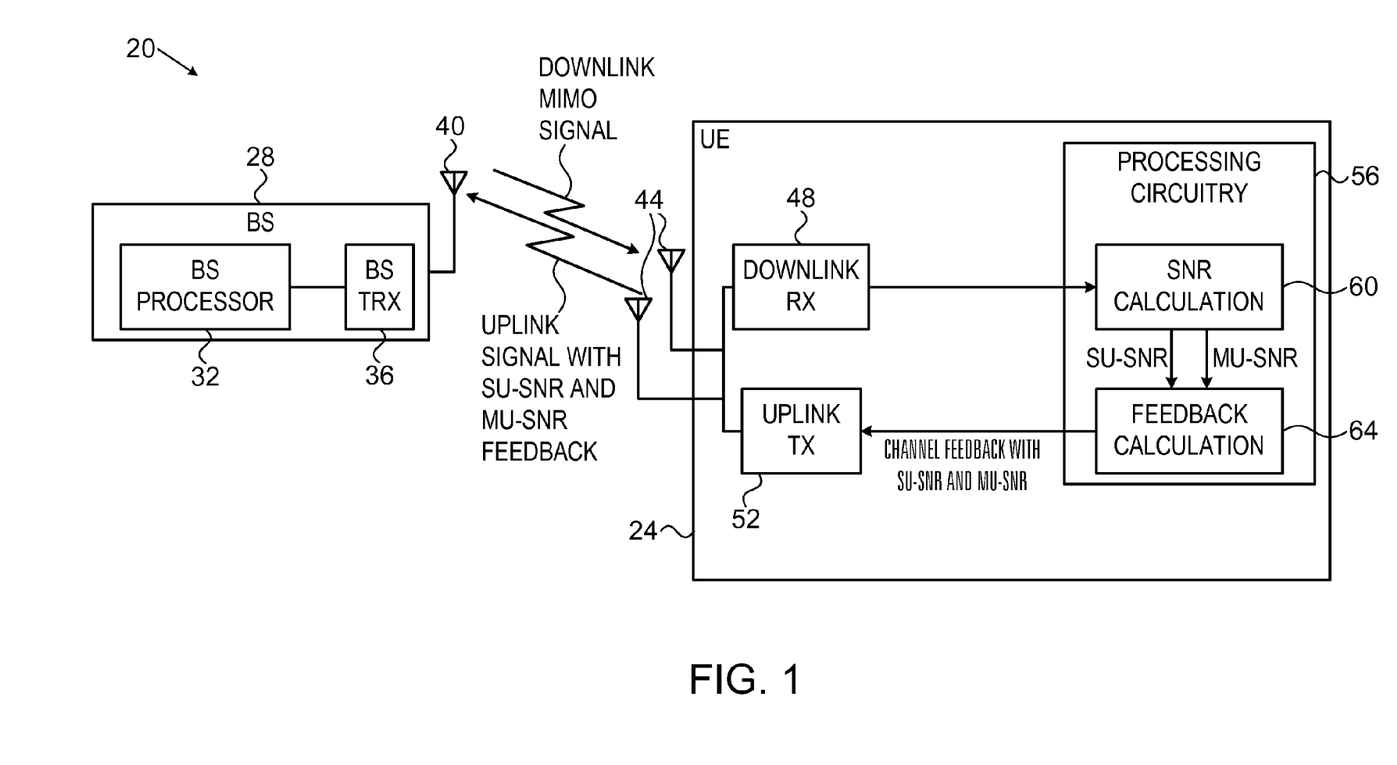
FIG. 1 is a block diagram that schematically illustrates a communication system, in accordance with an embodiment that is described herein.

FIG. 1 is a block diagram that schematically illustrates a communication system 20, in accordance with an embodiment that is described herein. System 20 comprises a mobile communication terminal 24, also referred to as a User Equipment (UE). The UE may comprise, for example, a cellular phone, a wireless-enabled mobile computer, or any other suitable type of terminal having communication capabilities. UE 24 communicates with a base station (BS) 28, also referred to as an eNodeB.

In the embodiments described herein, system 20 operates in accordance with the LTE-A specifications. Alternatively, however, system 20 may operate in accordance with any other suitable communication protocol, such as LTE or any communication protocol that uses MU-MIMO and in which full channel knowledge is not available. The example of FIG. 1 shows only a single BS and a single UE for the sake of clarity. Real-life systems, however, typically comprise multiple BSs and UEs.

BS 28 comprises a BS processor 32 that manages the various BS communication functions, a BS transceiver (TRX) 36 that carries out transmission and reception, and an antenna array 40 via which Radio Frequency (RF) signals are transmitted and received. In one embodiment, antenna array 40 comprises four or eight transmit antennas, and BS 28 uses these antennas for transmitting downlink MIMO signals.

In an embodiment, BS 28 supports both SU-MIMO and MU-MIMO transmission modes. Thus, at a given time, the downlink MIMO signal may comprise only a single transmission addressed to UE 24. At a different time, the downlink signal may comprise one or more additional transmissions, which are addressed to one or more other UEs (not shown in the figure) and are transmitted on the same time-frequency resource as the transmission to UE 24. BS 28 is able to alternate between the SU-MIMO and MU-MIMO modes as appropriate.

In the embodiment seen in FIG. 1, UE 24 comprises one or more receive antennas 44, a downlink receiver (RX) 48 for receiving the downlink signals from BS 28 and an uplink transmitter (TX) for transmitting uplink signals to the BS. UE 24 further comprises processing circuitry 56 that carries out the SNR and feedback calculation techniques described herein. In some embodiments, processing circuitry 56 comprises a SNR calculation unit 60 and a feedback calculation unit 64. SNR calculation unit 60 calculates the SU-SNR and MU-SNR for the received downlink signal, as will be explained in detail below.

Feedback calculation unit 64 calculates channel feedback based on the SU-SNR and the MU-SNR provided by unit 60. In a typical embodiment, the channel feedback calculated by unit 64 comprises a preferred MCS to be used in SU transmission (this MCS is denoted SU CQI), and a preferred MCS to be used in MU transmission (this MCS is denoted MU CQI).

Feedback calculation unit 64 provides the channel feedback to uplink transmitter 52, which transmits the feedback to BS 28. In some embodiments, the feedback based on the SU SNR is transmitted at a certain update rate, and the feedback based on the MU SNR is transmitted at a different update rate. In alternative embodiments, both types of feedback are transmitted at the same update rate.

BS processor 32 uses the feedback based on the SU-SNR and/or the feedback based on the MU-SNR to configure subsequent transmissions. In an example embodiment, the BS processor uses the feedback to assign precoding vectors, Modulation and Coding Schemes (MCS) and/or power levels to the various transmissions.

The UE configuration seen in FIG. 1 is a simplified example configuration, which is depicted solely for the sake of clarity. In alternative embodiments, any other suitable UE configuration can be used. UE elements that are not mandatory for understanding of the disclosed techniques have been omitted from the figure for the sake of clarity.

In various embodiments, some or all of the elements of UE 24, including receiver 48, transmitter and processing circuitry 56, are implemented in hardware, such as using one or more Radio Frequency Integrated Circuits (RFICs), Field-Programmable Gate Arrays (FPGAs) or Application-Specific Integrated Circuits (ASICs). In alternative embodiments, certain UE elements are implemented in software, or using a combination of hardware and software elements. In some embodiments, some or all of the elements of UE 24, including receiver 48, transmitter 52 and processing circuitry 56, are implemented in a signal processing chip-set for use in mobile communication terminals.

In some embodiments, certain UE elements, such as certain elements of processing circuitry 56, are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
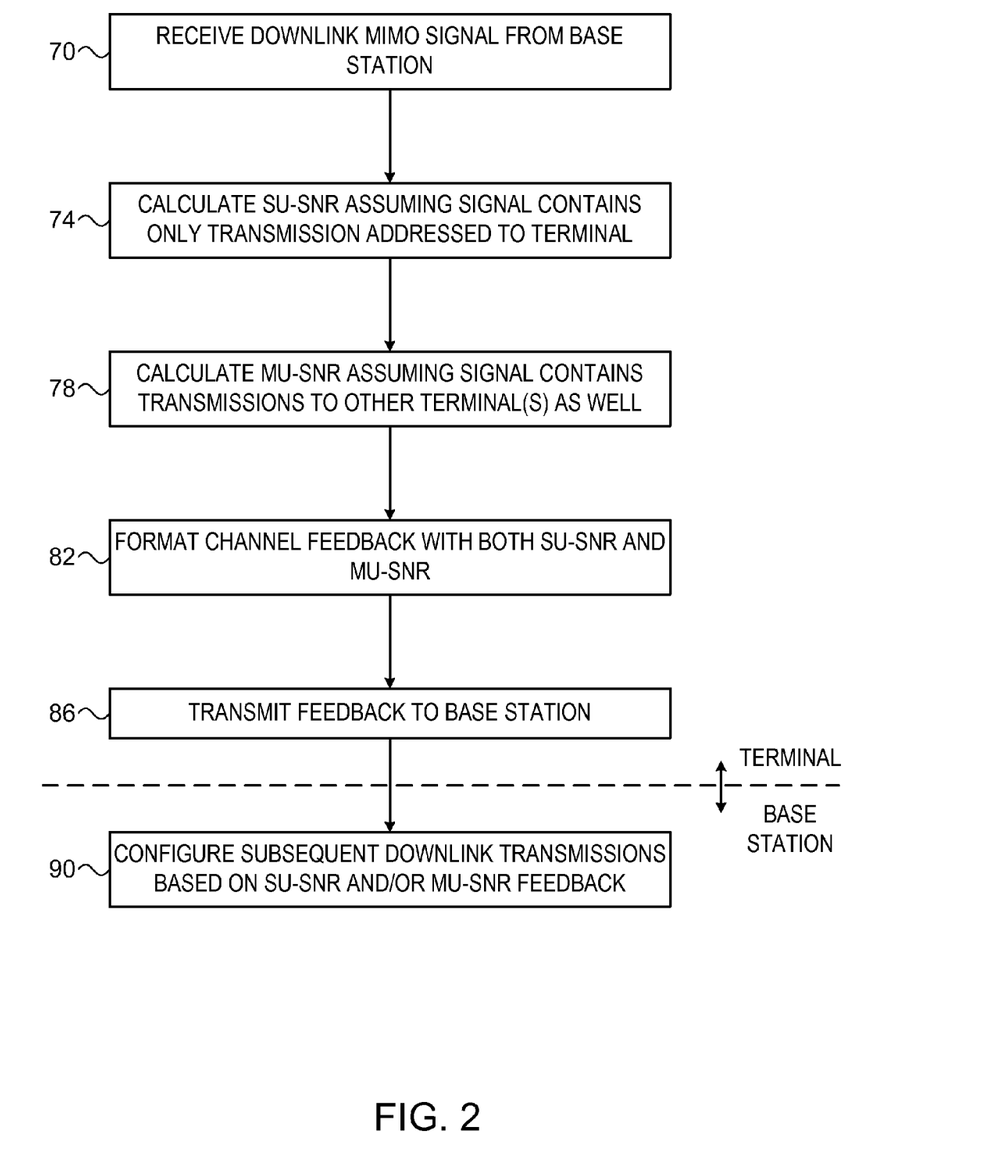
FIG. 2 is a flow chart that schematically illustrates a method for communication, in accordance with an embodiment that is described herein.

FIG. 2 is a flow chart that schematically illustrates a method for communication, in accordance with an embodiment that is described herein. The method begins with downlink RX 48 of UE 24 receiving a downlink MIMO signal from BS 28, at a downlink reception operation 70.

SNR calculation unit 60 calculates the SU-SNR of the received downlink signal, at a SU-SNR calculation operation 74. The SU-SNR is calculated under the assumption that the downlink signal contains only a single transmission that is addressed to UE 24.

SNR calculation unit 60 calculates the MU-SNR of the received downlink signal, at a MU-SNR calculation operation 78. The MU-SNR is calculated under the assumption that the downlink signal contains, in addition to the transmission addressed to UE 24, at least one other transmission to at least one other UE. Several example techniques for calculating the MU-SNR are described in detail further below.

Feedback calculation unit 64 calculates and formats channel feedback based on the SU-SNR, and channel feedback based on the MU-SNR, at a feedback calculation operation 82. Several example techniques for formatting the feedback, e.g., using differential encoding, are described further below. Uplink TX 52 transmits the two types of channel feedback to BS 28, at an uplink transmission operation 90. BS processor 32 in BS 28 configures subsequent downlink transmissions of the BS based on the SU-SNR related feedback and/or the MU-SNR related feedback, at a BS configuration operation 90.

In various embodiments, SNR calculation unit 60 calculates the MU-SNR in different ways. In one embodiment, unit 60 calculates the MU-SNR as:

$$MUSNR = \frac{\|Hv\|^2 P}{\frac{(\|H'H\|^2 - \|Hv\|^2)}{N_T - 1} P + 2N_0} \quad \text{Equation 1}$$

wherein H denotes the communication channel response matrix, v denotes the SU PMI requested by the UE, P denotes the received signal power, and $N_T$ denotes the number of base station transmit antennas (the number of transmit antennas in array 40).

In another embodiment, unit 60 calculates the MU-SNR by averaging over possible choices of precoding vectors assigned by the base station for other transmissions to other UEs. Typically, these precoding vectors are assumed orthogonal to one another and to the preferred precoding vector (PMI) requested by the UE:

$$MUSNR = \sum_{i=0}^{N_T-1} \frac{\|Hv\|^2 P}{\|Hu_i\|^2 P + 2N_0} \quad \text{Equation 2}$$

wherein $u_i$ denotes orthogonal precoding vectors that are possibly assigned by the base station to the transmissions to other UEs. In the example of Equation 2, averaging is carried out in the linear domain, i.e., arithmetic mean. In an alternative embodiment, averaging is performed logarithmically in dB, i.e., geometric mean.

In an embodiment, the orthogonal precoding vectors $u_i$ comprise $N_T-1$ algebraic basis vectors. When the base station and UEs select the precoding vectors from a mutually-agreed codebook, vectors $u_i$ may comprise (part or all of) the subset of vectors in the codebook that are orthogonal to the preferred precoding vector (PMI) requested by the UE. In 3GPP release 8 HHCB codebook, for example, eight code vectors have five orthogonal vectors each. The remaining eight code vectors have three orthogonal vectors each. In an embodiment, SNR averaging is carried out, for a given PMI, over the code vectors in the codebook that are orthogonal to this PMI.

The MU-SNR definitions given above are receiver-independent and applicable, for example, to Maximum Ratio Combining (MRC) receivers. For Minimum Mean Square Error (MMSE) receivers, in an embodiment, unit 60 optimizes the MU-SNR by:

$$MUSNR = \sum_{i=0}^{N_T-1} v'H'(K_N + K_I)^{-1} Hv \frac{P}{2} \quad \text{Equation 3}$$

wherein $$K_I = Hu_i u'_i H' \frac{P}{2},$$

v' denotes the UE recommended precoding vector (i.e., the precoding codebook entry corresponding to the selected PMI), $u_i$ denotes the $i^{th}$ precoding vector that is orthogonal to v', and $K_N$ denotes the noise covariance matrix for the SU case that captures inter-cell interference and thermal noise.

As explained above, Feedback calculation unit 64 formats and reports feedback based on the SU-SNR, and feedback based on the MU-SNR, to base station 28. In some embodiments, unit 64 formats or encodes the two types of feedback independently of one another. In other embodiments, unit 64 encodes one of the two types of feedback (the feedback SU-SNR based feedback or the MU-SNR based feedback) differentially relative to the other type of feedback.

In an example embodiment, Unit 64 encodes the SU-SNR using four bits, and the MU-SNR using two bits differentially relative to the SU-SNR. In Various differential quantization levels may be used. Table 1 below gives three possible differential encoding schemes. In Table 1, the SU-SNR is denoted x and the MU-SNR is denoted y:

TABLE 1

Example MU-SNR encoding schemes

| MCS level difference region | MU-SNR Differential quantization value | MU-SNR UE indication |
|---|---|---|
| Alternative I: | | |
| x − y ≤ 1 | 1 | 0 |
| x − y = 2 | 2 | 1 |
| x − y = 3 | 3 | 2 |
| x − y ≥ 4 | 4 | 3 |
| Alternative II: | | |
| x − y ≤ 2 | 1 | 0 |
| x − y = 3 | 2 | 1 |
| x − y = 4 | 3 | 2 |
| x − y > 5 | 4 | 3 |
| Alternative III: | | |
| x − y ≤ 3 | 3 | 0 |
| x − y = 4 | 4 | 1 |
| x − y = 5 | 5 | 2 |
| x − y > 6 | 6 | 3 |

In addition, the reported MU MCS is verified to lie between zero and fifteen. In alternative embodiments, the differential quantization is defined depending on the UE geometry, e.g., based on the distance between the UE and the base station. In an example embodiment, higher-geometry UEs (e.g., UEs close to the base station) are assigned higher offsets in the differential encoding, while lower-geometry UEs (e.g., UEs far from the base station) are assigned lower offsets.

In some embodiments, the MU CQI is reported per sub-band. (MU CQI denotes the index of the MCS to be used at a certain MU-SNR. The terms MU CQI and MU-SNR are sometimes used interchangeably herein.) In other embodiments the MU CQI comprises a wideband CQI that is reported for the entire spectrum allocation. In an embodiment, when using wideband MU CQI, the MU CQI is encoded differentially relative to the wideband SU CQI. The MU CQI per sub-band may be given by WB SU CQI+WB MU CQI Differential+SB SU CQI Differential. Alternatively, the MU CQI per sub-band may be given by WB SU CQI+WB MU CQI Differential. Further alternatively, unit 64 may provide a wideband PMI and CQI that are optimized for MU-MIMO transmission. Example simulation results for the above-described feedback configurations are provided in U.S. Provisional Patent Application 61/390,423, cited above.

In some embodiments, the SU-SNR based feedback from the UE corresponds to a certain number of spatial layers (also referred to as spatial streams) to be sent from the base station to the UE. This number of spatial layers is referred to as rank. In many practical scenarios, the MU performance gain is mainly due to rank 1 MU transmission per UE, i.e., transmission of a single spatial layer to each UE. Thus, in some embodiments, unit 64 calculates and provides MU CQI corresponding to rank 1, regardless of the rank used for SU CQI or SU PMI. In an embodiment, a rank 1 PMI is also fed back. The rank 1 PMI can be derived from the precoding vectors of the higher rank SU PMI. In an alternative embodiment, unit 64 calculates and provides MU CQI corresponding to rank 2, regardless of the rank used for SU CQI or SU PMI. In another embodiment, unit 64 calculates and provides MU CQI corresponding to both rank 1 and rank 2.

Let $v_0$ denote the precoding vectors corresponding to SU PMI. As explained above, the MU-SNR definition typically considers the effects of potential interference. In one embodiment, this interference is accounted for by assuming that the base station transmits interference in all directions that are orthogonal to the PMI requested by the UE. Let $\{v_i\}_{i=1}^{N_T-1}$ denote a set of mutually-orthogonal precoding vectors that form an orthonormal basis with $v_0$. For the case of four base station transmit antennas (4Tx), these vectors comprise orthogonal vectors in the Householder codebook that forms an orthonormal basis. For eight base station transmit antennas (8Tx), any possible orthonormal basis available in the codebook can be used.

In some embodiments, when calculating the MU-SNR, unit 60 assumes a certain ratio between the downlink signal power of the transmission addressed to UE and the total interference power. This ratio is denoted r. In one embodiment, the interference power is split equally among the transmissions addressed to other UEs. In such en embodiment, and assuming $N_T-1$ transmissions to the other UEs, the relative allocation of signal power to UE 24 and to the other UEs is [r, (1−r)/($N_T$−1), . . . , (1−r)/($N_T$−1)]. For the case of four base station transmit antennas, for example, the relative power allocation is [r, (1−r)/3, (1−r)/3, (1−r)/3]. Thus, the power of the desired signal (addressed to UE 24) is rP, while the power for each orthogonal direction (precoding vector) is (1−r)P/($N_T$−1).

Unit 60 may choose any suitable value of r, such as r=0.5, r=⅓, r=1/$N_T$ or any other suitable value. In an alternative embodiment, the relative allocation of signal power to UE 24 and to the other UEs is generalized as [d(0) . . . d($N_T$−1)], such that the sum of elements is unity. In this embodiment, r=d(0)/(d1+ . . . +d($N_T$−1)). Further alternatively, unit 60 may assign any other suitable power levels to the interfering layers (i.e., to the transmissions addressed to other UEs). In an example embodiment, at least two of these transmissions are assigned unequal power levels.

The total effective noise covariance matrix in the MU case, including possible intra-cell inter-layer interference, can be written as $K_{Total}=K_N+K_I$, wherein $K_I$ captures the potential MU interference:

$$K_{Total} = K_N + \frac{P(1-r)}{N_T-1}H\left(\sum_{i=1}^{N_T-1} v_i v_i'\right)H' \quad \text{Equation 4}$$

$$= K_N + \frac{P(1-r)}{N_T-1}H(I - v_1 v_1')H'$$

wherein $K_N$ denotes the original noise covariance matrix in the SU case. (More generally, the two $N_T-1$ terms in Equation 4 can be replaced with the number of interfering precoding vectors, i.e., with |S|, wherein S denotes the set of interfering precoding vectors. This format is independent of the actual precoding vectors in S.)

For the generalized allocation of signal power described above we can write:

$$K_{II} = PH\left(\sum_{i=1}^{N_T-1} d_i v_i v_i'\right)H' \quad \text{Equation 5}$$

The MU-SNR for the SU PMI can be most generally written as MU-SNR($v_0$)=f($v_0$,H,P,$K_{Total}$,r). In one embodiment, the MU-SNR is defined as:

$$MUSNR = \frac{\|Hv_0\|^2 rP}{\text{trace}(K_{Total})/numRx} \quad \text{Equation 6}$$

wherein numRX denotes the number of UE receive antennas.
For a MMSE receiver we can write:

$$MU\,SNR = (v_0' H' K_{Total}^{-1} H v_0) rP \quad \text{Equation 7}$$

For a MRC receiver we can write:

$$MUSNR = \frac{\|Hv_0\|^2 rP}{v_0' H' K_{Total} H v_0} \quad \text{Equation 8}$$

Since the PMI is already available, the additional complexity of the MU-SNR calculation is on the order of $\frac{1}{16}^{th}$ of the SU-SNR calculation. This complexity can be further reduced by exploiting intermediate results from the SU-SNR calculation, e.g., using the previously-calculated $Hv_0$.

For r=0.5, the covariance matrix is given by:

$$K_I = \frac{P}{2(N_T-1)}H\left(\sum_{i=1}^{N_T-1} v_i v_i'\right)H' \quad \text{Equation 9}$$

$$= \frac{P}{2(N_T-1)}H(I - v_0 v_0')H'$$

and the MU-SNR then becomes MU-SNR($v_0$)=f($v_0$, H, P, $K_{Total}$, r=0.5).

For r=1/$N_T$, the covariance matrix is given by:

$$K_I = \frac{P}{N_T}H\left(\sum_{i=1}^{N_T-1} v_i v_i'\right)H' \quad \text{Equation 10}$$

$$= \frac{P}{N_T}H(I - v_0 v_0')H'$$

and the MU-SNR becomes MU-SNR ($v_0$)=f($v_0$, H, P, $K_{Total}$, r=1/$N_T$).

Example simulation results of the above-described feedback schemes are given in U.S. Provisional Patent Application 61/411,845, cited above. In some embodiments, base station 28 uses the reported MU-CQI in its scheduling process. In an embodiment, the base station estimates the MU-SNR from the reported MCS, while correcting for the actual number of scheduled spatial layers. For example, when pairing two UEs, the base station estimates the SNR by SNR=SNR(MU CQI)/2r, wherein SNR(MU CQI) denotes the SNR that corresponds to the reported MU CQI.

In some embodiments, Equation 4 above can be replaced by an explicit expression of a set of interfering precoding vectors that are mutually-orthogonal and also orthogonal to the SU precoding vector requested by the UE (SU PMI). For example, the SU rank 1 precoding vector in the 8TX codebook is of the form:

$$u = \begin{bmatrix} v(\theta) \\ cv(\theta) \end{bmatrix} \theta \in \left\{\frac{2\pi k}{32}\right\}, \quad \text{Equation 11}$$

$$k = 0, \ldots, 31 \; c \in \{1, -1, j, -j\}$$

wherein $v(\theta)=[1 \; \exp(j\theta) \; \exp(j2\theta) \; \exp(j3\theta)]^T$.

The set of seven mutually-orthogonal vectors that are orthogonal to u is given by:

$$S = \quad \text{Equation 12}$$

$$\left\{\begin{bmatrix} v(\theta) \\ -cv(\theta) \end{bmatrix}, \begin{bmatrix} v(\theta+\pi/2) \\ cv(\theta+\pi/2) \end{bmatrix}, \begin{bmatrix} v(\theta+\pi/2) \\ -cv(\theta+\pi/2) \end{bmatrix}, \begin{bmatrix} v(\theta+\pi) \\ cv(\theta+\pi) \end{bmatrix}, \right.$$
$$\left. \begin{bmatrix} v(\theta+\pi) \\ -cv(\theta+\pi) \end{bmatrix}, \begin{bmatrix} v(\theta+3\pi/2) \\ cv(\theta+3\pi/2) \end{bmatrix}, \begin{bmatrix} v(\theta+3\pi/2) \\ -cv(\theta+3\pi/2) \end{bmatrix} \right\}$$

Example actual indices for the interfering precoding vectors, per the notation of the 8TX codebook defined in the 3GPP specifications, are given further below.

In Equation 4 above, the signal power allocation assumed by the UE for the various layers depends on r. In an embodiment, we assume r=0.5. Under this assumption, the power allocation for eight layers is [P/2,P/14,P/14,P/14,P/14,P/14,P/14,P/14], where the first term corresponds to the layer addressed to the UE and the other terms correspond to the interfering layers.

In some embodiments, simpler sets of interfering precoding vectors are defined, for example for UE testing purposes. An example test would assume that the base station transmits using the exact configuration that the UE assumed while calculating the CQI. In such a case, the MU CQI defined in Equations 4, 11 and 12 would imply that the test equipment transmits to seven other virtual UEs, using the seven precoding vectors in the set S of Equation 12. However, LTE Release 10 supports transmission to up to four spatially-multiplexed UEs. It is therefore desirable to modify the MU CQI definition so that the test equipment transmission is compatible with the assumptions made by the UE in the MU CQI calculation.

In an example modified definition of the MU CQI, the orthonormal basis is replaced by reduced sets of four orthogonal PMIs. Two possible examples of reduced sets are given by:

$$S1 = \left\{ \begin{bmatrix} v(\theta) \\ -cv(\theta) \end{bmatrix}, \begin{bmatrix} v(\theta+\pi) \\ cv(\theta+\pi) \end{bmatrix}, \begin{bmatrix} v(\theta+\pi) \\ -cv(\theta+\pi) \end{bmatrix} \right\} \quad \text{Equation 13}$$

$$S2 = \left\{ \begin{bmatrix} v(\theta+\pi/2) \\ cv(\theta+\pi/2) \end{bmatrix}, \begin{bmatrix} v(\theta+\pi) \\ cv(\theta+\pi) \end{bmatrix}, \begin{bmatrix} v(\theta+3\pi/2) \\ cv(\theta+3\pi/2) \end{bmatrix} \right\} \quad \text{Equation 14}$$

For these reduced sets, the power allocation is [P/2,P/6,P/6]. Example actual indices for the interfering precoding vectors in these sets, per the notation of the 8TX codebook defined in the 3GPP specifications, are given below.

In accordance with the 8TX codebook specified in the 3GPP specifications, the set S of precoding vectors in Equation 12 can be expressed as a set of interfering PMIs in the codebook. Let $(i_0, j_0)$ denote the index of the signal PMI (e.g., from the SU CQI/PMI) corresponding to the W1 and W2 codebook, respectively. Let $j_0 = 4d_0 + p_0$, where $d_0$ denotes the DFT selection index ranging from 0 to 3 and $p_0$ denotes the phase selection index ranging from 0 to 3. Indices $i_0$ and $j_0$ range from 0 to 15. The indices of the seven interfering PMIs can then be written as:

$$(i_0, 4d_0 + (p_0+2)\bmod 4), ((i_0+4)\bmod 16, 4d_0 + p_0), \quad \text{Equation 15}$$
$$((i_0+4)\bmod 16, 4d_0 + (p_0+2)\bmod 4),$$
$$((i_0+8)\bmod 16, 4d_0 + p_0),$$
$$((i_0+8)\bmod 16, 4d_0 + (p_0+2)\bmod 4),$$
$$((i_0+12)\bmod 16, 4d_0 + p_0),$$
$$((i_0+12)\bmod 16, 4d_0 + (p_0+2)\bmod 4)$$

For the three-layer MU CQI in the set S1 of Equation 13, example interfering PMI indices are given by:

$$(i_0, 4d_0 + (p_0+2)\bmod 4), ((i_0+8)\bmod 16, 4d_0 + p_0), \quad \text{Equation 16}$$
$$((i_0+8)\bmod 16, 4d_0 + (p_0+2)\bmod 4)$$

For the three-layer MU CQI in the set S2 of Equation 14, example interfering PMI indices are given by:

$$(i_0, 4d_0 + (p_0+2)\bmod 4), ((i_0+8)\bmod 16, 4d_0 + p_0), \quad \text{Equation 17}$$
$$((i_0+12)\bmod 16, 4d_0 + p_0)$$

In alternative embodiments, any subset of size k can be deduced from the set given in Equation 15 and optimized. The power allocation in such an embodiment is $[P/2, P/(2k), \ldots, P/(2k)]$. The power allocation can also be generalized as $[Pr, (1-r)P/k, \ldots, (1-r)P/k]$.

Note also that that the above-described sets of indices may not be unique due to the overlap in the W1 codebook. It can be shown that by modifying the values of $i_0$ and $d_0$, it is possible to obtain the index of another PMI that gives the same precoding vector. For example, if $d_0 > 1$, then the precoding vector corresponding to $(i_0+1) \bmod 16$, $d_0-2$, $p_0$ is the same as the precoding vector represented by $i_0$, $d_0$, $p_0$. If $d_0 < 2$, then the precoding vector corresponding to $(i_0-1) \bmod 16$, $(d_0+2)$, $p_0$ is the same as that of $i_0$, $d_0$, $p_0$.

In an alternative embodiment, the following table gives the indices of the interfering PMIs that the UE should account for in calculating the MU SNR. The indices are given per each possible value of the SU-MIMO rank 1 PMI:

TABLE 2

Example indices of interfering PMIs

| SU-MIMO rank 1 PMI | Interfering rank 1 PMIs for MU SNR calculation |
| --- | --- |
| 0 | 1, 2, 3 |
| 1 | 2, 3, 0 |
| 2 | 3, 0, 1 |
| 3 | 0, 1, 2 |
| 4 | 5, 6, 7 |
| 5 | 6, 7, 4 |
| 6 | 7, 4, 5 |
| 7 | 4, 5, 6 |
| 8 | 9, 10, 11 |
| 9 | 10, 11, 8 |
| 10 | 11, 8, 9 |
| 11 | 8, 9, 10 |
| 12 | 13, 14, 15 |
| 13 | 14, 15, 12 |
| 14 | 15, 12, 13 |
| 15 | 12, 13, 14 |

In this embodiment, the power allocation for the signal and interfering layers is $[rP, (1-r)P, (1-r)P, (1-r)P]$. In alternative embodiments, the interfering PMIs can be reduced to subsets of the sets given in Table 2. For example, each PMI can have two interfering PMIs. In these embodiments, the power allocation can be $[P/3, P/3, P/3]$, or alternatively $[P/2, P/4, P/4]$, or more generally $[rP, (1-r)P/2, (1-r)P/2]$. Further alternatively, Table 2 can be reduced to one interfering PMI per PMI. In such an embodiment, the power allocation is typically $[P/2, P/2]$.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   receiving in a mobile communication terminal over a communication channel a Multiple-Input Multiple-Output (MIMO) signal that comprises at least a transmission addressed to the terminal;
   based on the received signal, estimating in the terminal a Multi-User Signal to Noise Ratio (MU-SNR), which is indicative of a power ratio between the transmission addressed to the terminal and remaining components of the signal, which are assumed to comprise one or more transmissions addressed to one or more other terminals, wherein the MU-SNR is computed under an assumption that the transmissions addressed to the other terminals are precoded with respective precoding vectors that are orthogonal to a precoding vector requested by the terminal for precoding the transmission addressed to the terminal, and wherein computing the MU-SNR comprises averaging the MU-SNR over multiple possible choices of the orthogonal precoding vectors; and transmitting from the terminal feedback that is indicative of the communication channel and is based on the MU-SNR.

2. The method according to claim 1, wherein the MIMO signal is transmitted from a base station using $N_T$ transmit antennas, and wherein computing the MU-SNR comprises calculating the MU-SNR over $N_T$-1 possible choices of the orthogonal precoding vectors.

3. A method, comprising:
receiving in a mobile communication terminal over a communication channel a Multiple-Input Multiple-Output (MIMO) signal that comprises at least a transmission addressed to the terminal;
based on the received signal, estimating in the terminal a Multi-User Signal to Noise Ratio (MU-SNR), which is indicative of a power ratio between the transmission addressed to the terminal and remaining components of the signal, which are assumed to comprise one or more transmissions addressed to one or more other terminals, wherein the MU-SNR is computed under an assumption that the transmissions addressed to the other terminals are precoded with respective precoding vectors that are orthogonal to a precoding vector requested by the terminal for precoding the transmission addressed to the terminal, and wherein computing the MU-SNR comprises assigning to the transmissions addressed to the other terminals respective power levels, at least two of which being different from one another; and
transmitting from the terminal feedback that is indicative of the communication channel and is based on the MU-SNR.

4. The method according to claim 1, comprising estimating a Single-User Signal to Noise Ratio (SU-SNR), which is computed under an assumption that the signal is addressed only to the terminal, wherein transmitting the feedback comprises transmitting first feedback based on the SU-SNR and second feedback based on the MU-SNR.

5. The method according to claim 4, wherein transmitting the first and second feedback comprises sending one of the first and second feedback in a format that is differentially encoded relative to the other of the first and second feedback.

6. The method according to claim 4, wherein transmitting the first and second feedback comprises sending the first and second feedback encoded independently of one another.

7. The method according to claim 4, wherein transmitting the first and second feedback comprises sending the first feedback at a first update rate, and sending the second feedback at a second update rate, different from the first update rate.

8. The method according to claim 1, wherein the communication feedback comprises at least one feedback type selected from a group of types consisting of a Rank-1 Channel Quality Indication (CQI) and a Rank-2 CQI.

9. Apparatus, comprising:
a receiver, which is configured to receive over a communication channel a Multiple-Input Multiple-Output (MIMO) signal that comprises at least a transmission addressed to the receiver;
a processor, which is configured to estimate, based on the received signal, a Multi-User Signal to Noise Ratio (MU-SNR), which is indicative of a power ratio between the transmission addressed to the receiver and remaining components of the signal, which are assumed to comprise one or more transmissions addressed to one or more other receivers, wherein the processor is configured to estimate the MU-SNR under an assumption that the transmissions addressed to the other terminals are precoded with respective precoding vectors that are orthogonal to a precoding vector requested by the terminal for precoding the transmission addressed to the terminal, to compute the MU-SNR by averaging the MU-SNR over multiple possible choices of the orthogonal precoding vectors, and to calculate feedback that is indicative of the communication channel and is based on the MU-SNR; and
a transmitter, which is configured to transmit the feedback.

10. The apparatus according to claim 9, wherein the MIMO signal is transmitted from a base station using $N_T$ transmit antennas, and wherein the processor is configured to compute the MU-SNR over $N_T$-1 possible choices of the orthogonal precoding vectors.

11. The apparatus according to claim 9, wherein the processor is configured to estimate a Single-User Signal to Noise Ratio (SU-SNR), which is computed under an assumption that the signal is addressed only to the receiver, and to calculate first feedback based on the SU-SNR and second feedback based on the MU-SNR.

12. The apparatus according to claim 11, wherein the processor is configured to calculate one of the first and second feedback in a format that is differentially encoded relative to the other of the first and second feedback.

13. The apparatus according to claim 11, wherein the processor is configured to encode the first and second feedback independently of one another.

14. The apparatus according to claim 9, wherein the communication feedback comprises at least one feedback type selected from a group of types consisting of a Rank-1 Channel Quality Indication (CQI) and a Rank-2 CQI.

15. A mobile communication terminal comprising the apparatus of claim 9.

16. A chipset for processing signals in a mobile communication terminal, comprising the apparatus of claim 9.

* * * * *